No. 670,263. Patented Mar. 19, 1901.
L. E. WHITON.
SCROLL CHUCK.
(Application filed Apr. 14, 1900.)
(No Model.)
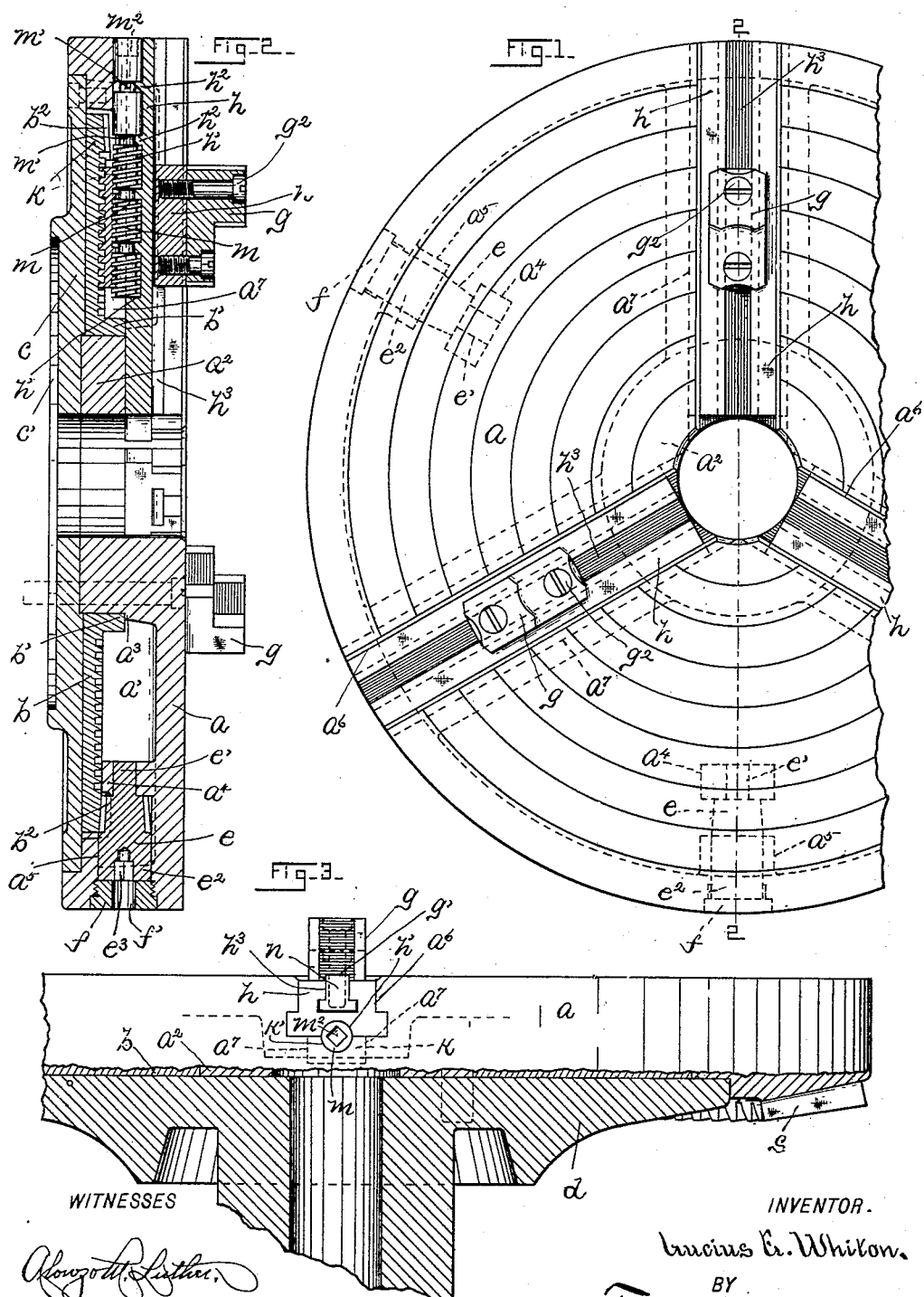
INVENTOR.
Lucius E. Whiton.
BY
Frank H. Allen,
ATTORNEY

UNITED STATES PATENT OFFICE.

LUCIUS E. WHITON, OF NEW LONDON, CONNECTICUT.

SCROLL-CHUCK.

SPECIFICATION forming part of Letters Patent No. 670,263, dated March 19, 1901.

Application filed April 14, 1900. Serial No. 12,949. (No model.)

*To all whom it may concern:*

Be it known that I, LUCIUS E. WHITON, a citizen of the United States, residing at New London, county of New London, State of Connecticut, have invented certain new and useful Improvements in Scroll-Chucks, of which the following is a full, clear, and exact description.

The object of this invention is a provide a certain improvement that is applicable to "chucks" and to "boring-mill tables," which improvement consists particularly in a peculiar manner of mounting the jaws in the chuck-body whereby a limited or wide range of adjustment of the said jaws may be attained and making possible the convenient reversal of the jaws, as well as the removal of the same and the substitution of a complete set of jaws.

The movement of the jaws in gripping the work held by the chuck is simultaneously accomplished under ordinary conditions by powerful geared scroll mechanism, and independent adjustment is also provided for each jaw in order that work which may have been previously finished may be held perfectly true in said chuck and so that provision may be made for bunches or other irregularities that may be present in castings, &c., which are to be "chucked."

It should also be noted that the said improvements are of such a nature that the working parts of the chuck are inclosed and thus kept free from all dirt and chips that might otherwise enter and clog the said working parts.

To assist in explaining my invention, I have provided the accompanying sheet of drawings, which serve to explain the same, as follows:

Figure 1 is a plan view of a chuck fitted up with my improvements. Fig. 2 is a central sectional view of said chuck, taken on the line 2 2. Fig. 3 shows a boring-mill table, partly in elevation and partly in central section, having my improvements applied thereto.

Referring to the drawings, the letter $a$ denotes the body or shell of a chuck or boring-mill table, as the case may be, and $a'$ a circular recess within said shell. The geared scroll $b$ is located in the recess $a'$ and is adapted to rotate around a centrally-bored hub portion $a^2$ of the shell $a$.

The letter $c$ denotes the back plate of the chuck, having formed therein a recess $c'$, by means of which the chuck may be readily mounted on the face plate of a lathe, or in the place of the said back-plate a portion of the spindle $d$ of a boring-mill may be provided, as shown in Fig. 3.

The back plate $c$ or the spindle $d$ when in position serves to retain the scroll $b$ in place in the recess $a'$, the said scroll being confined between the elements $c$ or $d$ and a shoulder $a^3$, formed on the central portion $a^2$ of the shell $a$ and engaged by the hub $b'$ of the scroll $b$. In order to rotate the scroll $b$, one or more bevel-gears $e$ are provided, said gears being located in the circular recess $a'$ and having their axial central lines extending radially from the center of the shell. Each gear $e$ is in meshing contact with radially-extending bevel gear-teeth $b^2$, formed in the face of the scroll adjacent to the said gear, and to support the latter a lug $a^4$ is formed on the shell $a$, said lug extending into the circular recess $a'$ and being drilled to receive a shouldered down extension $e'$ of the said gear, while an oppositely-extending portion $e^2$, of equal or slightly-greater diameter than the gear, is received in a bearing $a^5$, provided in the circumferential wall of the shell $a$. The bearing $a^5$ is tapped to receive a plug $f$, which after the gear $e$ has been placed in position is screwed into the said bearing to retain the gear in place. The plug $f$ has a central opening $f'$ extending therethrough to allow the insertion of a suitable wrench in an angular hole $e^3$, provided in the gear projection $e^2$ to effect the rotation of the latter. The gear $e$ when rotated causes the rotation of the scroll $b$ in the usual manner, such rotation of the scroll in turn causing the chuck-jaws to approach or recede from the central axial line of the body $a$, as hereinafter described.

The chuck-jaws are denoted by the reference-letter $g$, and the letter $a^6$ denotes radially-extending T-slots provided in the shell $a$, which slots receive certain blocks or carriers $h$, to which the jaws $g$ are adjustably secured. The carriers $h$ are approximately of the same length as the slots $a^6$ and close the latter and are adapted to be moved by the scroll $b$, as hereinafter explained, and after the jaws $g$ have been secured to the said carriers the latter become practically a part of said jaws. The carriers $h$ in the T-slots $a^6$ are not in direct engagement with the scroll $b$, which latter when rotated effects the simultaneous movement of the several carriers; but intermediate each carrier and the said scroll is a slider $k$, extending parallel with the carrier and capable of limited longitudinal or radial movement between the side walls $a^7$ of a chamber provided for said carrier in the shell $a$. The face of the slider $k$ adjacent the scroll $b$ is provided with teeth that engage and coact with the said scroll, and the opposite face of the slider and the adjacent face of the carrier $h$ are provided, respectively, with semicircular recesses $h'$ $k'$, extending parallel with the length of the said carrier and slider, thus providing a circular chamber for the reception of a screw $m$, whose inner end engages the end wall of the recess $h'$. The operative face of the scroll-section is recessed, so that the scroll proper is located considerably below the gear-teeth $b^2$ and below the end of the hub $b'$, thus providing abutments or walls that serve to limit the endwise movement of the said sliders $k$, as is best seen in Fig. 2 of the drawings.

The semicircular wall of the recess $h'$ is provided with a number of flanges $h^2$, which enter grooves $m'$ in the said screw $m$ and serve to prevent longitudinal or thrust movement of the screw $m$ within the said recess $h'$, and the semicircular recess of the slider $k$ is tapped to receive the screw $m$, and it will be seen that upon its rotation the latter will travel longitudinally on the slider $k$ and impart like motion to the carrier $h$. In order that the rotation of the screw $m$ may be readily accomplished, its outer end is provided with an angular hole $m^2$ for the reception of a suitable wrench.

The carrier $h$, the slider $k$, and the screw $m$ under ordinary conditions preserve the same positions relatively to each other and are moved as a single structure and in unison with the companion similar structures of the chuck through the engagement of the scroll $b$ with the slider $k$; but should it become necessary or desirable to vary the position of the carrier $h$ to adjust the jaw $g$, mounted thereon, such adjustment may be quickly effected by properly rotating the screw $m$, so as to change the position of the carrier $h$ and its jaw $g$ with respect to the slider $k$ and the companion jaws of the chuck.

Each carrier $h$ in the T-slots $a^6$ of the shell $a$ is provided in its upper face with a T-slot $h^3$ to receive a block $n$, which block $n$ is substantially equal in length with the jaw $g$, and the latter is provided in its under face with a channel $g'$ for the reception of the upper portion of the said block. The jaw $g$ and the block $n$ are secured together by screws $g^2$, and when the said screws are turned home to draw the said block and jaw together the portions of the block adjacent the overhanging portions of the slot $h^3$ will be drawn into contact with such overhanging portions and the jaw $g$ will be forced into close contact with the confronting face of the carrier $h$, thus clamping the jaw and the block $n$ firmly upon the carrier $h$, so that they will operate as a single structure. It will now be seen that by easing up on the screws $g^2$ the jaw $g$ and the clamping-block $n$ may be very readily adjusted to any point within the limits of the T-slots $h^3$ of the carrier $h$, thus providing a wide range of independent adjustment for said jaw, or upon separating the block $n$ and the jaw the latter may be reversed upon the said block or the jaw, with its companions, may be removed, and an entire new set quickly substituted. Should it be desired to secure a fine individual adjustment for any one of the jaws, such adjustment may be quickly and accurately obtained by means of the screw $m$ engaging the slider $k$ and the carrier $h$, as already explained, or should it be desired to cause the several jaws to move in unison to grip the work after the jaws have been properly adjusted, as just explained, such common movement of the jaws is obtained by means of the described geared scroll mechanism.

It should be noted that the carriers $h$, closing the slots $a^6$, effectually cover the working parts of the chuck mechanism, thus inclosing the same against dirt, chips, &c., as I have already stated.

When my newly-invented improvements are applied to the table of a boring-mill, as illustrated in Fig. 3, the rear face of the circumferential wall of the shell $a$ is provided with radially-extending bevel-gear teeth $s$, which latter are designed to mesh with a gear of the table-rotating mechanism.

In connection with my newly-invented improvements it should be noted that the construction of the carriers $h$ and elements immediately related thereto is such that the said elements may be readily removed from or introduced into the chuck-body. To accomplish the removal of said elements, the screw $m$ is rotated to cause the carrier $h$ to travel outward in its slot $a^6$ until said screw becomes disengaged from its slider $k$, after which the carrier $h$ may be withdrawn from the slot $a^6$ and the screw $m$ and the slider $k$ may be removed through the said slot, or should it be desired to insert the said elements in the body $a$ it will be apparent that a reversal in the order of the operations just described will be necessary.

By reason of the independent adjustment of the chuck-jaws provided by the screws $m$ and the sliders $k$ the "chucking" of a piece of work is very rapidly accomplished, doing away with the previous necessity of repeatedly removing the work to be held by the chuck in order to expose the screws $g^2$, which the work may cover, that the said screws may be manipulated to permit the adjustment of the jaws.

Having now described my invention, I claim—

1. In a chuck, in combination, a scroll-section and a toothed-jaw-operating slider in mesh with the said scroll; the scroll-section being recessed to provide abutments that limit the endwise travel of the said slider.

2. In combination, a chuck-body chambered and slotted radially as described, a scroll mounted to revolve in said chamber, jaw-carriers mounted in said radial slots, sliders $k$ in mesh with the scroll, and screws intermediate the jaw-carriers and sliders; the sliders being threaded to engage the screws and the latter being held against endwise displacement on the jaw-carriers, substantially as specified.

3. In combination, a chambered and radially-slotted chuck-body, a scroll-section revolubly mounted in said body, jaw-operating sliders in mesh with said scroll capable of relatively-limited radial movement in said chuck-body, the said sliders and radial slots being relatively of such widths that the sliders may be entered and removed through the said radial slots in a direction parallel to the chuck-axis, and a back plate fitting said chuck-body and supporting said scroll-section.

4. In combination, a chambered and radially-slotted chuck-body, a scroll-section revolubly mounted in said body, jaw-operating sliders in mesh with said scroll and capable of relatively-limited radial movement in said body, the said sliders and radial slots being relatively of such widths that the sliders may be entered and removed through the said radial slots in a direction parallel to the chuck-axis, and a flanged machine-spindle fitting said chuck-body and supporting said scroll-section.

5. In combination, a chambered and radially-slotted chuck-body, a scroll-section revolubly mounted in said body, jaw-operating sliders in mesh with said scroll and capable of relatively-limited radial movement in said body, the said sliders and radial slots being relatively of such widths that the sliders may be entered and removed through the said radial slots in a direction parallel to the chuck-axis, a driving-gear formed integrally with or attached to said chuck-body and a flanged spindle fitted to said chuck-body and supporting said scroll-section.

6. In combination, a radially-slotted chuck-body, carrier-blocks mounted to slide in said radial slots and provided with undercut slots as set forth, blocks $n$ mounted to slide in said undercut carrier-slots, jaws having recessed faces engaging the said blocks $n$ and means for clamping the jaw, block and carrier together.

Signed at Norwich, Connecticut, this 28th day of March, 1900.

LUCIUS E. WHITON.

Witnesses:
ALONZO M. LUTHER,
FRANK H. ALLEN.